(12) United States Patent
Nielsen et al.

(10) Patent No.: US 11,015,574 B2
(45) Date of Patent: May 25, 2021

(54) METHOD FOR CONTROLLING AN AIRBORNE OBJECT COUPLED TO A WIND TURBINE

(71) Applicant: Vestas Wind Systems A/S, Aarhus N. (DK)

(72) Inventors: Thomas S. Bjertrup Nielsen, Randers Sv (DK); Torben Ladegaard Baun, Skødstrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/958,775

(22) PCT Filed: Jan. 21, 2019

(86) PCT No.: PCT/DK2019/050020
§ 371 (c)(1),
(2) Date: Jun. 29, 2020

(87) PCT Pub. No.: WO2019/141331
PCT Pub. Date: Jul. 25, 2019

(65) Prior Publication Data
US 2020/0362814 A1    Nov. 19, 2020

(30) Foreign Application Priority Data
Jan. 22, 2018  (DK) .......................... PA 2018 70036

(51) Int. Cl.
*F03D 5/00* (2006.01)
*B64C 31/06* (2020.01)
(Continued)

(52) U.S. Cl.
CPC ................ *F03D 5/00* (2013.01); *B64C 31/06* (2013.01); *B64C 39/022* (2013.01); *F03D 9/34* (2016.05);
(Continued)

(58) Field of Classification Search
CPC ...... F05B 2240/9176; F05B 2240/9172; F03D 5/00; F03D 9/34; F03D 9/30; B64C 31/06;
(Continued)

(56) References Cited

U.S. PATENT DOCUMENTS 9,709,026 B2 * 7/2017 Vander Lind ............. F03D 9/25
10,145,356 B1 * 12/2018 Nordstrom ............ B64C 39/022
(Continued)

FOREIGN PATENT DOCUMENTS

EP        0391601 A2   10/1990
EP        2685093 A1    1/2014
(Continued)

OTHER PUBLICATIONS

Danish Patent and Trademark Office, Search and Examination Report in PA 2018 70036, dated Sep. 26, 2018.
(Continued)

*Primary Examiner* — Tulsidas C Patel
*Assistant Examiner* — Joseph Ortega
(74) *Attorney, Agent, or Firm* — Wood Herron & Evans LLP

(57) ABSTRACT

A method of controlling an airborne object (2), such as a kite or a glider, is disclosed. The airborne object (2) may be an airborne energy generating system. The airborne object (2) is coupled to a part of a wind turbine (1), such as a nacelle (4), a tower (3) or a foundation, via a cable (7). At least one parameter related to movements (8) of the tower (3) of the wind turbine (1) is measured, and a cable force (9) of the cable (7) acting on the wind turbine (1) is adjusted, based on the at least one measured parameter. Thereby the tower movements (8) can be counteracted and fatigue can be reduced.

12 Claims, 3 Drawing Sheets

(51) Int. Cl.
  *B64C 39/02*  (2006.01)
  *F03D 9/34*  (2016.01)

(52) U.S. Cl.
  CPC .................. *F05B 2240/9172* (2020.08); *F05B 2240/9176* (2020.08)

(58) Field of Classification Search
  CPC ..... B64C 39/022; Y02E 10/72; Y02E 10/728; Y02E 10/70
  See application file for complete search history.

(56) References Cited

U.S. PATENT DOCUMENTS

| | | | |
|---|---|---|---|
| 2010/0001534 A1 | 1/2010 | Kim | |
| 2012/0013128 A1* | 1/2012 | Duke | F03B 13/264 290/54 |
| 2012/0104763 A1* | 5/2012 | Lind | B64C 31/06 290/55 |
| 2013/0307274 A1* | 11/2013 | Sia | F03D 9/008 290/55 |
| 2015/0130188 A1* | 5/2015 | Goldstein | B64C 39/022 290/44 |
| 2015/0183516 A1* | 7/2015 | Vander Lind | B64C 39/022 244/155 R |
| 2015/0251755 A1* | 9/2015 | Schaefer | F03D 5/00 290/55 |
| 2015/0275861 A1* | 10/2015 | Goldstein | F03D 7/02 290/44 |
| 2015/0298806 A1* | 10/2015 | Vander Lind | F03D 9/008 518/704 |
| 2015/0308411 A1* | 10/2015 | Goldstein | B64C 31/06 290/44 |
| 2015/0330368 A1* | 11/2015 | Goldstein | F03D 11/04 290/44 |
| 2016/0208780 A1 | 7/2016 | Calverley | |
| 2017/0121036 A1* | 5/2017 | Hachtmann | B64C 39/022 |
| 2017/0152838 A1* | 6/2017 | Thomsen | F03D 80/50 |
| 2019/0177006 A1* | 6/2019 | Quick | F03D 5/00 |
| 2020/0300213 A1* | 9/2020 | Navarro | F03D 1/04 |
| 2020/0300219 A1* | 9/2020 | Carter | G09F 21/06 |
| 2021/0033069 A1* | 2/2021 | Lindholm | B64C 31/06 |

FOREIGN PATENT DOCUMENTS

| | | |
|---|---|---|
| EP | 3184813 A1 | 6/2017 |
| WO | 2010064918 A1 | 6/2010 |
| WO | 2010143214 A1 | 12/2010 |

OTHER PUBLICATIONS

European Patent Office, International Search Report and Written Opinion in PCT Application No. PCT/DK2019/050020, dated Apr. 26, 2019.

* cited by examiner

METHOD FOR CONTROLLING AN AIRBORNE OBJECT COUPLED TO A WIND TURBINE

FIELD OF THE INVENTION

The present invention relates to a method for controlling an airborne object, e.g. an airborne wind energy system, such as a kite or a glider, coupled to a wind turbine. According to the method of the invention, the airborne object is controlled in such a manner that movements of the tower of the wind turbine are counteracted.

BACKGROUND OF THE INVENTION

Modern wind turbines are used for generating electrical energy for a power grid. To this end, a set of wind turbine blades coupled to a rotor are directed into the incoming wind, and the energy of the wind is extracted by the wind turbine blades and causes the rotor to rotate, thereby converting the energy of the wind into mechanical energy. The rotor is connected to a generator, either directly or via a gear arrangement, and thereby the mechanical energy of the rotating rotor is converted into electrical energy. The electrical energy is supplied to a power grid, via suitable components.

During operation as well as during erection of the wind turbine, the tower of the wind turbine may be subjected to movements, such as deflections, bending moments, etc. Such tower movements may cause fatigue in the tower and/or the foundation, and it is therefore desirable to reduce or dampen the movements. To this end, various mechanical dampers have previously been applied at or in wind turbines, e.g. in the tower or in the nacelle.

DESCRIPTION OF THE INVENTION

It is an object of embodiments of the invention to provide a method for controlling an airborne object coupled to a wind turbine in a manner which reduces or dampens movements of the tower of the wind turbine.

The invention provides a method of controlling an airborne object, the airborne object being coupled to a part of a wind turbine via a cable, the wind turbine comprising a tower mounted on a foundation, the method comprising the steps of:
  measuring at least one parameter related to movements of the tower of the wind turbine, and
  adjusting a cable force of the cable acting on the wind turbine, based on the at least one measured parameter.

Thus, the invention provides a method for controlling an airborne object. In the present context the term 'airborne object' should be interpreted to mean an object which can be launched to a high altitude. The airborne object could, e.g., be in the form of a kite or a glider. The airborne object may be capable of producing electrical energy, but it may also be of a kind which does not produce electrical energy. This will be described in further detail below.

The airborne object is coupled to a part of the wind turbine via a cable. It should be noted that the cable could be in the form of an electrical cable, a wire, a rope, a line, or any other suitable kind of cable which provides a mechanical connection between the airborne object and a connecting point at a relevant part of the wind turbine.

The wind turbine comprises a tower mounted on a foundation. The wind turbine may further comprise at least one nacelle mounted on the tower and at least one rotor, i.e. the wind turbine may be a fully erected and operational wind turbine. Alternatively, a nacelle and/or a rotor may not yet have been mounted on the tower, i.e. the wind turbine may be in the process of being erected. In this case undesirable movements of the tower, which must be reduced or dampened, may also occur.

The cable of the airborne object is coupled to a part of the wind turbine, e.g. to the tower or the foundation, or, in the case that the wind turbine is fully erected, to the nacelle. This will be described in further detail below.

According to the method of the invention, at least one parameter related to movements of the tower of the wind turbine is initially measured. The measured parameter(s) could include a direct measurement of the movement of the tower, such as a direction, a speed, an acceleration, etc., for instance using a suitable kind of sensor, such as an accelerometer. Alternatively or additionally, it may include an indirect measurement of the tower movement, such as a strain in the tower or in the foundation. In any event, the measured parameter(s) provide(s) a suitable measure for the current movements of the tower.

Next, a cable force of the cable acting on the wind turbine is adjusted, based on the at least one measured parameter. The cable force is adjusted in such a manner that the movements of the tower are counteracted, thereby reducing and/or dampening the movements of the tower. Accordingly, fatigue caused by such tower movements can be reduced.

For instance, the cable force may be adjusted in such a manner that a cable force acting in a direction which is opposite to a direction of movement of the tower is increased or in such a manner that a cable force acting in a direction which is in the same direction as the direction of movement of the tower is decreased. Alternatively or additionally, the adjustment of the cable force may follow and counteract changes in the tower movements. Furthermore, the adjustment of the cable force may include adjusting a direction of the cable force, e.g. in order to align the cable force with a main direction of the tower movements, thereby allowing the cable force to efficiently counteract the tower movements.

It is not ruled out that the wind turbine has two or more airborne objects coupled thereto. This will allow tower movements along multiple directions to be counteracted. For instance, tower movements along the direction of the incoming wind as well as tower movements along a lateral direction being substantially perpendicular to the incoming wind may be simultaneously and efficiently counteracted in this case.

Thus, the method according to the invention may be used for dampening tower oscillations. The control of the airborne object may be performed in a manner which is coordinated with the control of the wind turbine. Thereby the control of the airborne object and the control of the wind turbine may cooperate in order to obtain dampening of tower movements, such as tower oscillations.

In the case that the wind turbine is an offshore wind turbine, the tower movements may partly be caused by waves acting on the wind turbine. Such tower movements may also be counteracted by means of the method according to the present invention. In order to allow such tower movements to be counteracted, it may be advantageous to couple the cable a lower part of the tower. Since the direction of movements of the tower being caused by waves acting on the tower must be expected to be independent of the direction of the incoming wind, it may be highly relevant to adjust the direction of the cable force in this case.

For instance, in the case that two or more airborne objects are mounted on the wind turbine, one of the airborne objects may be dedicated for counteracting tower movements caused by waves acting on the wind turbine while another airborne object may be dedicated for counteracting tower movements caused by the wind acting on the wind turbine.

It is an advantage that the tower movements are counteracted or dampened by adjusting the cable force provided by an airborne object in the manner described above, instead of by means of conventional oscillation dampers, because adjustments of the cable force can be provided in a fast and reliable manner. Furthermore, this is a mechanically simple solution which requires little maintenance. In the case that the airborne system is of a kind which generates electrical energy, the airborne system is already coupled to the wind turbine, and no additional parts are required in order to counteract tower movements.

The airborne object may be an airborne wind energy system for generating electrical energy. According to this embodiment, the airborne object is used for producing electrical energy, apart from being used for counteracting tower movements. However, the airborne object may alternatively be of a kind which does not produce electrical energy. In this case the airborne object is provided on the wind turbine with the sole purpose of counteracting undesired tower movements. This allows the control of the airborne object to be performed without taking other considerations than the tower movements into account, and thereby the tower movements can be very efficiently counteracted.

In the case that the airborne object is an airborne wind energy system for generating electrical energy, the electrical energy generated by the airborne wind energy system may be used for supplementing the electrical energy generated by the wind turbine. Accordingly, in this case the airborne object serves a dual purpose of generating electrical energy and counteracting tower movements.

An airborne wind energy system is capable of harvesting energy of the wind at a high altitude. The harvested energy is transferred to a station arranged at or near a lower part of the wind turbine, e.g. a ground station, either in the form of mechanical energy or in the form of electrical energy. In the case that the transferred energy is in the form of mechanical energy, a generator will normally be arranged at the station at the lower part of the wind turbine in order to convert the mechanical energy into electrical energy. In the case that the transferred energy is in the form of electrical energy, the airborne wind energy system comprises an airborne generator, i.e. the part of the system which is launched to a high altitude includes a generator. The part of the airborne wind energy system being launched to a high altitude may, e.g., include a kite or a glider.

For instance, in the case that the harvested energy is transferred to the station at the lower part of the wind turbine in the form of mechanical energy, the cable may be connected to a winch. The cable may be extracted by the wind moving the airborne object outwards, thereby causing rotations of the winch and generating electrical energy. Subsequently, the cable may be retrieved by rotating the winch. This consumes energy, but less than the energy produced during extraction of the cable. In this case the airborne object may advantageously be in the form of a kite.

In the case that the harvested energy is transferred to the station at the lower part of the wind turbine in the form of electrical energy, the airborne object may be provided with one or more rotors connected to one or more generators, and the cable may be in the form of an electrically conductive cable. In this case the airborne object may be launched, and subsequently caused to perform specific movement patterns in order to cause the one or more rotors to rotate, thereby generating electrical energy. In this case the airborne object may advantageously be in the form of a glider.

The step of measuring at least one parameter related to movements of the tower of the wind turbine may comprise measuring a direction of movement of the tower, a speed of the tower, an acceleration of the tower, a strain in the tower and/or a strain in the foundation.

The direction of movement of the tower, the speed of the tower and the acceleration of the tower provide direct measurements of the movement of the tower, whereas the strain in the tower and the strain in the foundation provide indirect measurements which are indicative of the movement of the tower. The at least one parameter may, e.g., be measured by means of one or more accelerometers arranged in the tower and/or in the nacelle, by means of one or more strain gauges in the tower and/or in the foundation, and/or by means of optic fibres in the tower and/or in the foundation.

The step of adjusting a cable force of the cable may comprise increasing the cable force in the case that the movement of the tower is along a direction away from the airborne object, and/or decreasing the cable force in the case that the movement of the tower is along a direction towards the airborne object.

The airborne object may advantageously be launched from the wind turbine along the direction of the incoming wind. This allows the airborne object to efficiently catch the wind. Furthermore, in the case that the wind turbine is fully erected and operational, this ensures that the airborne object is launched in a direction away from the rotor, thereby minimising the risk of collisions between the airborne object and the wind turbine blades.

The cable defines a direct line between the airborne object and the wind turbine, and the cable force acts along this line.

In the case that the movement of the tower is along a direction away from the airborne object, the movement of the tower can be counteracted by increasing the cable force, thereby pulling the tower in a direction which is opposite to the measured tower movement.

Similarly, in the case that the movement of the tower is along a direction towards the airborne object, the movement of the tower can be counteracted by decreasing the cable force. The cable force will, in this case, pull the tower in the same direction as the measured tower movement, and by decreasing the cable force the total force acting on the tower in this direction is decreased, thereby counteracting the tower movement. The cable force may even be decreased to zero, in which case the cable no longer applies a force to the wind turbine.

The movement of the tower may be composed of movements along several directions, and may originate from several causes. One direction may be regarded as a main direction of movement. This could, e.g., be the direction of the resulting movement of the tower, or it could be the direction of the movement which provides the largest contribution to the resulting movement of the tower.

The step of adjusting a cable force may comprise adjusting a direction of the cable force. This could, e.g., include adjusting the direction of the cable force in order to align the cable force with the main direction of movement of the tower. This will typically include moving the airborne object to a new position. When the cable force is aligned with the main direction of movement of the tower, the movements of the tower can be efficiently counteracted by means of the airborne object.

The step of adjusting a cable force of the cable may comprise modifying a movement pattern of the airborne object. This could, e.g., include moving the airborne object to a different position relative to the wind turbine in order to adjust the direction of the cable force acting on the wind turbine.

In the case that the airborne object is an airborne wind energy system of a kind which comprises one or more airborne generators, adjusting the movement pattern may include adjusting the paths which the airborne object follows in order to harvest energy from the wind by means of the airborne generator(s). Thereby the magnitude as well as the direction of the cable force acting on the wind turbine can be adjusted. Further, and applying the same movement pattern, a pitch angle and/or a speed of the airborne wind energy system may be changed. Thereby the cable force acting on the wind turbine can be increased or decreased. For some versions of airborne objects the pitch angle and corresponding speed of the airborne object can be changed by the adjustment of flaps or similar devices.

In the case that the airborne object is an airborne wind energy system of a kind which transfers the harvested energy to a station at the lower part of the wind turbine in the form of mechanical energy, adjusting the movement pattern may include adjusting a speed at which the cable is extracted and/or retrieved. Thereby the cable force acting on the wind turbine can be increased or decreased. Even if the airborne wind energy system is of a kind which comprises one or more airborne generators, the cable force may still be adjusted by extracting and/or retrieving the cable.

Thus, one end of the cable may be connected to a winch at the wind turbine, and the step of adjusting a cable force of the cable may comprise adjusting an operational speed of the winch.

The wind turbine may further comprise at least one nacelle mounted on the tower and at least one rotor, and one end of the cable may be coupled to the nacelle of the wind turbine. Since the nacelle is normally mounted at an upper end of the tower in order to position the rotor at a high level, the cable is thereby coupled to the wind turbine at a high level. This allows the airborne object to be launched to a high altitude without requiring a long cable. This is in particular an advantage in the case that the airborne object is an airborne wind energy system.

Furthermore, movements of the tower are expected to be largest at the upper part of the tower. Coupling the cable to the nacelle ensures that the point of attack of the cable force is positioned at or near the upper part of the tower, and thereby the impact of the cable force on the tower movement is high.

Finally, coupling the cable to the nacelle allows the cable to be rotated along when the nacelle performs yawing movements relative to the tower in order to direct the wind turbine blades into the incoming wind. Thereby it is automatically ensured that the cable maintains a suitable direction with respect to the rotor, e.g. in order to prevent collisions between the airborne object and the wind turbine blades.

The cable may advantageously be coupled to the nacelle at a position which is at or near a centre axis defined by the tower. Thereby the cable force acting on the wind turbine will add no or only minor yaw moments to the wind turbine.

As an alternative, one end of the cable may be mounted to the foundation or the tower of the wind turbine. In the case that the cable is mounted to the tower of the wind turbine, it may advantageously be mounted to an upper part of the tower in order to maximise the impact of the cable force on the tower movements.

As described above, when the cable is mounted to the foundation or the tower of the wind turbine, a nacelle and a rotor are not necessarily mounted on the tower yet, or may have been removed as part of dismantling of the wind turbine. Accordingly, this allows tower movements to be counteracted also during erection or dismantling of the wind turbine. This may, e.g., allow the wind turbine to be erected or dismantled even if high wind speeds or high wave impacts occur, because the resulting tower movements are counteracted, thereby allowing components, such as nacelle, rotor, wind turbine blades, etc., to be hoisted to or lowered from the upper part of the tower without risking collisions, and while being able to position these components precisely.

The cable may be mounted to the foundation or the tower via a bearing system arranged circumferentially with respect to the tower. Thereby the cable can be rotated relative to the tower, e.g. synchronously with the yawing movements of the nacelle, thereby ensuring that a suitable position of the cable relative to the wind turbine is maintained. Alternatively or additionally, this may be used for adjusting a direction of the cable force. It should be noted that, alternatively to using a bearing system, this could also be obtained by mounting the cable rotatably with respect to the tower in other manners, e.g. via a rail system.

The step of adjusting a cable force of the cable may comprise adjusting a length of the cable. Decreasing the length of the cable will increase the cable force while increasing the length of the cable will decrease the cable force. Thus, the cable force can be adjusted by retrieving the cable, i.e. decreasing the length of the cable, or by releasing the cable, i.e. increasing the length of the cable.

The method may further comprise the step of retracting the airborne object in the case that the wind speed exceeds a predefined threshold level and/or in the case that the cable force of the cable exceeds a predefined threshold level.

In the case that the wind speed exceeds a predefined threshold level, it may be considered unsafe to continue having the airborne object launched, and/or wind speeds above the predefined threshold level may introduce a risk that an excessive cable force occurs. It may therefore be desirable to retract the airborne object in the case that wind speeds above the predefined threshold level are detected.

Similarly, in the case that the cable force of the cable exceeds a predefined threshold level, there may be a risk that the cable force exceeds the design strength of the cable or the strength of the coupling between the cable and the wind turbine, or even contributes to exceeding the design strength of the tower and/or foundation. It may therefore be desirable to retract the airborne object in the case that a cable force above the predefined threshold level is detected.

The method may further comprise the step of decreasing the cable force in the case that gusty wind conditions are detected. Similarly to the embodiments described above, gusty wind conditions may lead to excessive or unreliable cable forces, and it may therefore be desirable to decrease the cable force in the case that gusty wind conditions are detected. As an alternative, the airborne object may be moved to a position at a higher or lower altitude, where the gusty wind conditions are not present, or to positions in the sphere further to the left or right or further upwards for the same cable length resulting in reduced pitch angles and thereby reduced cable forces.

BRIEF DESCRIPTION OF THE DRAWINGS

The invention will now be described in further detail with reference to the accompanying drawings in which.

DETAILED DESCRIPTION OF THE DRAWINGS

Figure 1:
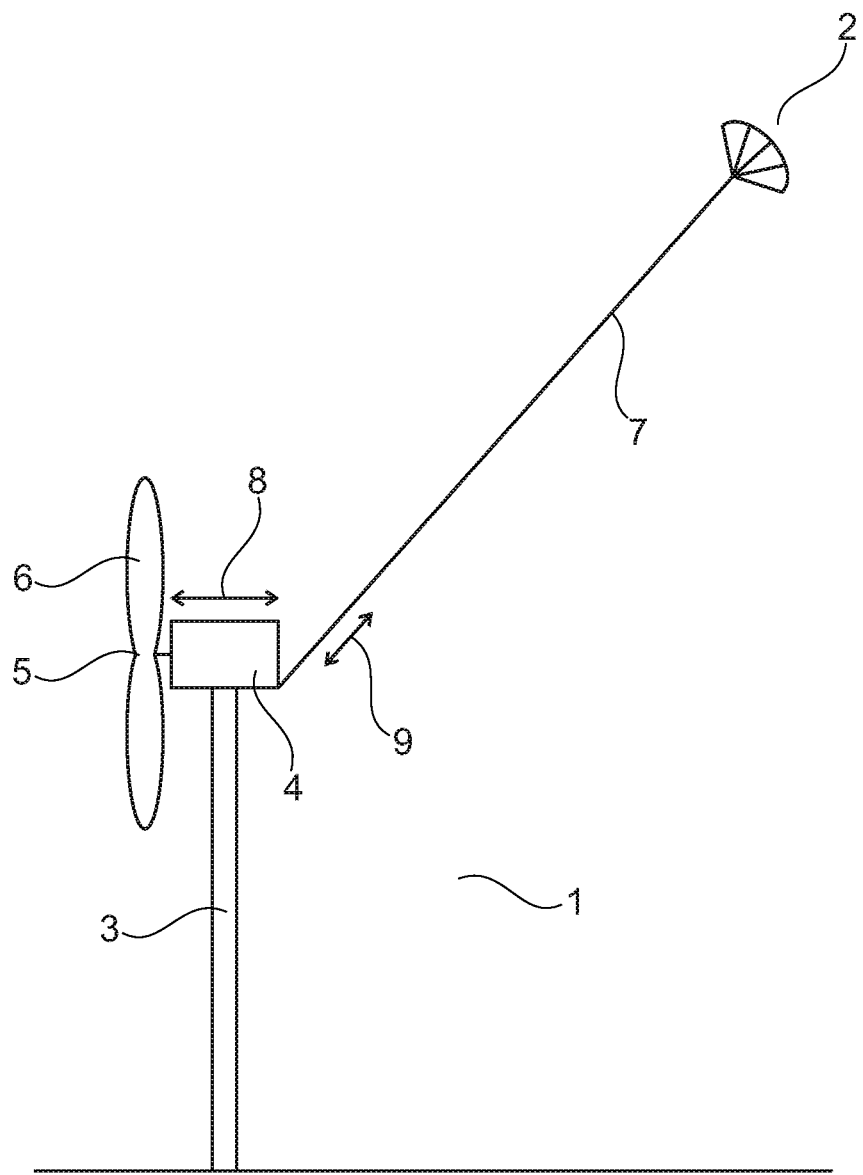
FIG. 1 is a side view of a wind turbine having an airborne object mounted thereon.

FIG. 1 is a side view of a wind turbine 1 having an airborne object 2 mounted thereon. The airborne object 2 is in the form of a kite, and may be an airborne wind energy system, or of a kind which is not capable of generating electrical energy.

The wind turbine 1 comprises a tower 3, a nacelle 4 mounted on top of the tower 3 and a rotor 5 carrying a set of wind turbine blades 6. The airborne object 2 is coupled to a lower part of the nacelle 4 via a cable 7. It should be noted that the cable 7 could alternatively have been coupled to another part of the nacelle 4, such as on top of the nacelle 4, to the tower 3 or to a foundation (not shown) on which the tower 3 is mounted.

The airborne object 2 is controlled in accordance with a method according to an embodiment of the invention. Thus, the airborne object 2 may be controlled in the following manner.

At least one parameter related to movements of the tower 3, illustrated by arrow 8, is measured. The parameter(s) could, e.g., include a direction of movement, a speed, an acceleration, a strain in the tower 3 and/or a strain in the foundation. The parameter(s) may, e.g., be measured by means of one or more accelerometers arranged in the tower 3 and/or in the nacelle 4, by means of one or more strain gauges on the tower 3 and/or on the foundation, by means of one or more optic fibres in the tower 3 and/or in the foundation, and/or in any other suitable manner. In any event, the measured parameter(s) provide(s) a suitable measure for the movement 8 of the tower 3.

Next, a cable force, illustrated by arrow 9, of the cable 7 acting on the wind turbine 7 is adjusted, based on the at least one measured parameter. Thus, the cable force 9 is adjusted in accordance with the movements 8 of the tower 3, and in order to counteract the movements 8 of the tower 3. For instance, in the case that the movements 8 of the tower 3 are in a direction away from the airborne object 2, the cable force 9 may be increased by decreasing the length of the cable 7, i.e. by retracting the cable 7, thereby pulling the wind turbine 1 in a direction towards the airborne object 2, i.e. opposite to the tower movements 8.

Similarly, in the case that the movements 8 of the tower 3 are in a direction towards the airborne object 2, the cable force 9 may be decreased by increasing the length of the cable 7, i.e. by releasing the cable 7. Thereby the wind turbine 1 is pulled towards the airborne object 2, i.e. in the same direction as the tower movements 8, by the cable 7 to a less extent, and the tower movements 8 in this direction are thereby counteracted.

Figure 2:
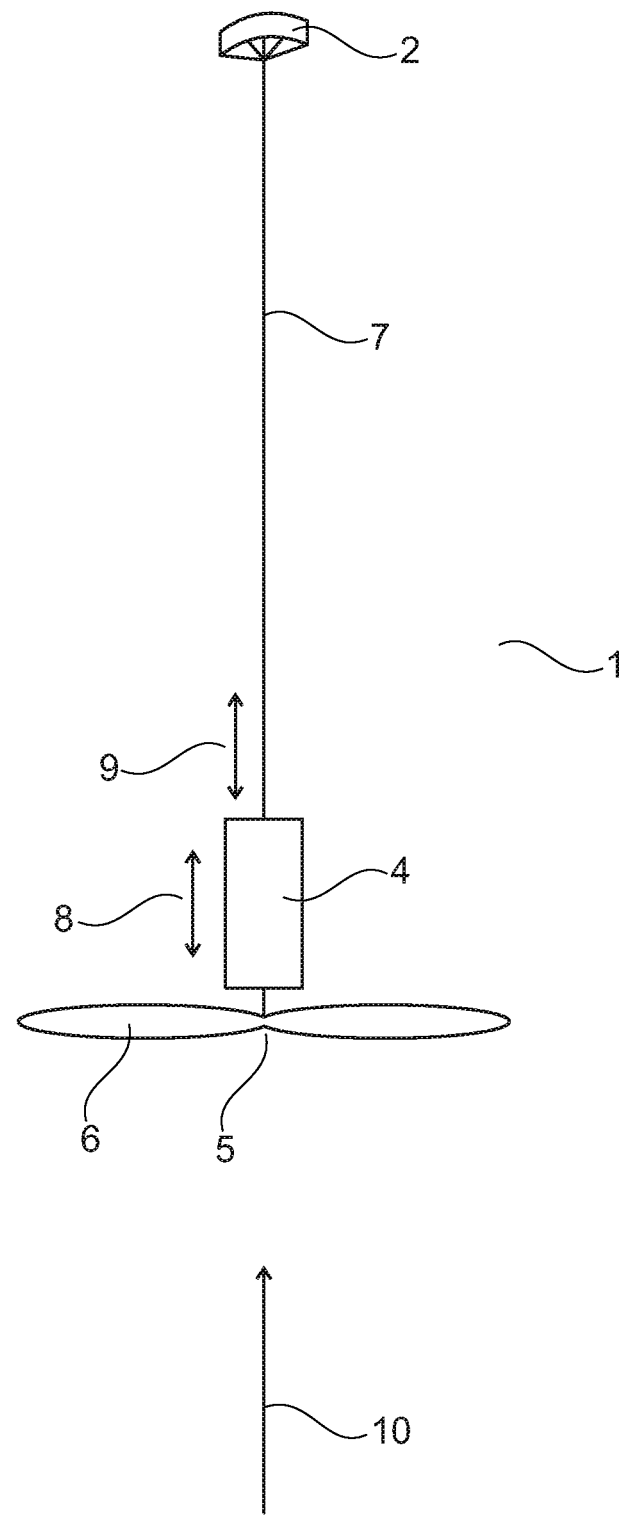
FIGS. 2 and 3 are top views of the wind turbine of FIG. 1.
Figure 3:
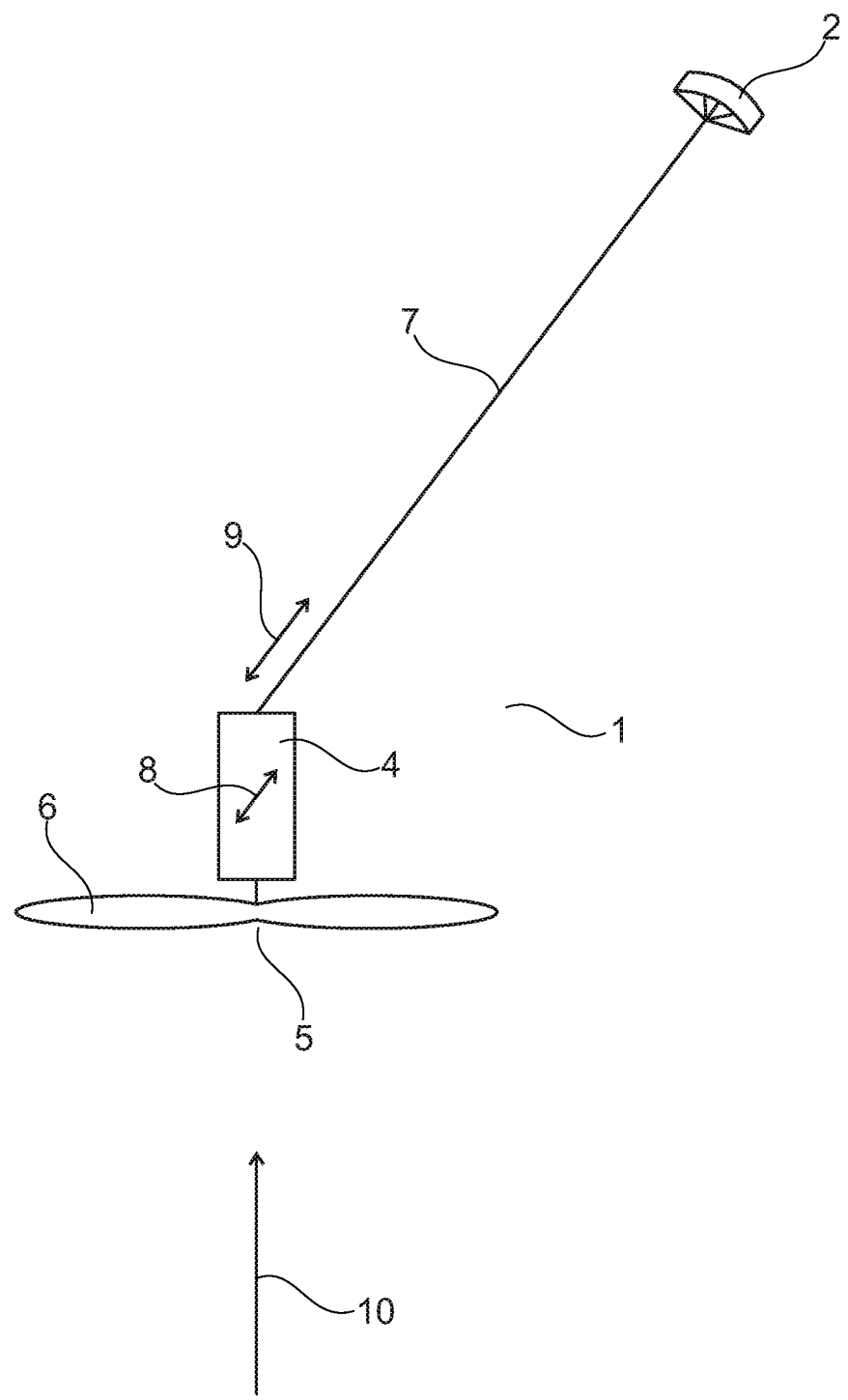

FIGS. 2 and 3 are top views of the wind turbine 1 of FIG. 1. The direction of the incoming wind is illustrated by arrow 10. It can be seen that in FIG. 2 as well as in FIG. 3, the nacelle 4 has been yawed to a position in which the wind turbine blades 6 are directed towards the incoming wind 10.

In FIG. 2 the airborne object 2 has been launched in the direction of the incoming wind 10, and thereby the cable 7 interconnecting the airborne object 2 and the wind turbine 1 is arranged along the direction of the incoming wind 10. Thus, the cable force 9 also acts along this direction.

In the situation illustrated in FIG. 2, tower movements 8 along a direction parallel to the incoming wind 10 are measured. In order to counteract the tower movements 8 the cable force 9 is adjusted, e.g. in the manner described above with reference to FIG. 1.

In the situation illustrated in FIG. 3, tower movements 8 along a direction defining an angle with respect to the direction of the incoming wind 10 are measured. Thus, the direction of the measured tower movements 8 comprises a component along the direction of the incoming wind 10 as well as a component along a lateral direction, i.e. perpendicularly to the direction of the incoming wind 10. In order to counteract the measured tower movements 8 the airborne object 2 has been moved to a position which arranges the cable 7 along a direction which is parallel to the direction of the measured tower movements 8.

Thereby the cable force 9 is applied along the direction of the measured tower movements 8, thereby allowing the tower movements 8 to be counteracted in an efficient manner.

The magnitude of the cable force 9 may further be adjusted, e.g. in the manner described above with reference to FIG. 1.

The invention claimed is:

1. A method of controlling an airborne object, the airborne object being coupled to a part of a wind turbine via a cable, the wind turbine comprising a tower mounted on a foundation, the method comprising the steps of:
    measuring at least one parameter related to movements of the tower of the wind turbine, and
    adjusting a cable force of the cable acting on the wind turbine, based on the at least one measured parameter.

2. The method according to claim 1, wherein the airborne object is an airborne wind energy system for generating electrical energy.

3. The method according to claim 1, wherein the step of measuring at least one parameter related to movements of the tower of the wind turbine comprises measuring a direction of movement of the tower, a speed of the tower, an acceleration of the tower, a strain in the tower and/or a strain in the foundation.

4. The method according to claim 1, wherein the step of adjusting a cable force of the cable comprises increasing the cable force in the case that the movement of the tower is along a direction away from the airborne object, and/or decreasing the cable force in the case that the movement of the tower is along a direction towards the airborne object.

5. The method according to claim 1, wherein the step of adjusting a cable force of the cable comprises modifying a movement pattern of the airborne object.

6. The method according to claim 1, wherein one end of the cable is connected to a winch at the wind turbine, and wherein the step of adjusting a cable force of the cable comprises adjusting an operational speed of the winch.

7. The method according to claim 1, wherein the wind turbine further comprises at least one nacelle mounted on the tower and at least one rotor, and wherein one end of the cable is coupled to the nacelle of the wind turbine.

8. The method according to claim 1, wherein one end of the cable is mounted to the foundation or the tower of the wind turbine.

9. The method according to claim 8, wherein the cable is mounted via a bearing or rail system arranged circumferentially with respect to the tower.

10. The method according to claim 1, wherein the step of adjusting a cable force of the cable comprises adjusting a length of the cable.

11. The method according to claim 1, further comprising the step of retracting the airborne object in the case that the wind speed exceeds a predefined threshold level and/or in the case that the cable force of the cable exceeds a predefined threshold level.

12. The method according to claim 1, further comprising the step of decreasing the cable force in the case that gusty wind conditions are detected.

* * * * *